United States Patent

[11] 3,618,929

| [72] | Inventor | Harold R. Upchurch |
| | | Durham, N.C. |
| [21] | Appl. No. | 813,001 |
| [22] | Filed | Apr. 3, 1969 |
| [45] | Patented | Nov. 9, 1971 |
| [73] | Assignee | Sperry Rand Corporation |

[54] HOLDING AND MASKING FIXTURE FOR APPLYING A COATING OF THERMOSETTING MATERIAL TO SELECTED SURFACES OF A PART
4 Claims, 6 Drawing Figs.

[52] U.S. Cl. .................................................. 269/6,
117/18, 117/21, 117/25, 117/38, 118/503,
118/504, 269/52, 269/238
[51] Int. Cl. ........................................................ B25b 1/04,
B44d 1/095
[50] Field of Search ........................................... 117/8.5, 18,
21, 25, 38; 118/301, 406, 503, 504; 269/6, 52, 238

[56] References Cited
UNITED STATES PATENTS

| 3,034,479 | 5/1962 | Larsh et al. ................... | 118/406 |
| 3,185,131 | 5/1965 | Manning ....................... | 118/406 |
| 3,226,245 | 12/1965 | Dettling et al. ............... | 117/94 |
| 3,247,004 | 4/1966 | Dosser .......................... | 118/308 |
| 3,261,707 | 7/1966 | Korski et al. .................. | 118/406 |
| 3,355,309 | 11/1967 | Bender et al. ................. | 118/301 |
| 3,355,310 | 11/1967 | De Jean et al. ............... | 118/308 |
| 3,367,789 | 2/1968 | Mommsen ..................... | 118/301 |
| 3,377,984 | 4/1968 | Mommsen et al. ............ | 118/301 |
| 3,418,150 | 12/1968 | Jones et al. .................... | 117/18 |
| 3,431,887 | 3/1969 | Pettigrew et al. ............. | 118/406 |
| 3,440,078 | 4/1969 | Sharetts ......................... | 118/406 |

Primary Examiner—William D. Martin
Assistant Examiner—Raymond M. Speer
Attorney—S. C. Yeaton ABSTRACT: A holding and masking fixture for hand use in the fluidized bed method of applying a coating of thermosetting material to selected surfaces of relatively small parts. The heated part is mounted in a masking fixture configured to clamp the part by the surfaces thereof to remain uncoated thereby precisely masking those surfaces. The masked part is immersed into a powder cloud of the thermosetting material, and the coated part is baked thereby curing the adhered thermosetting material.

PATENTED NOV 9 1971 3,618,929

INVENTOR
HAROLD R. UPCHURCH
BY
*H P Terry*
ATTORNEY

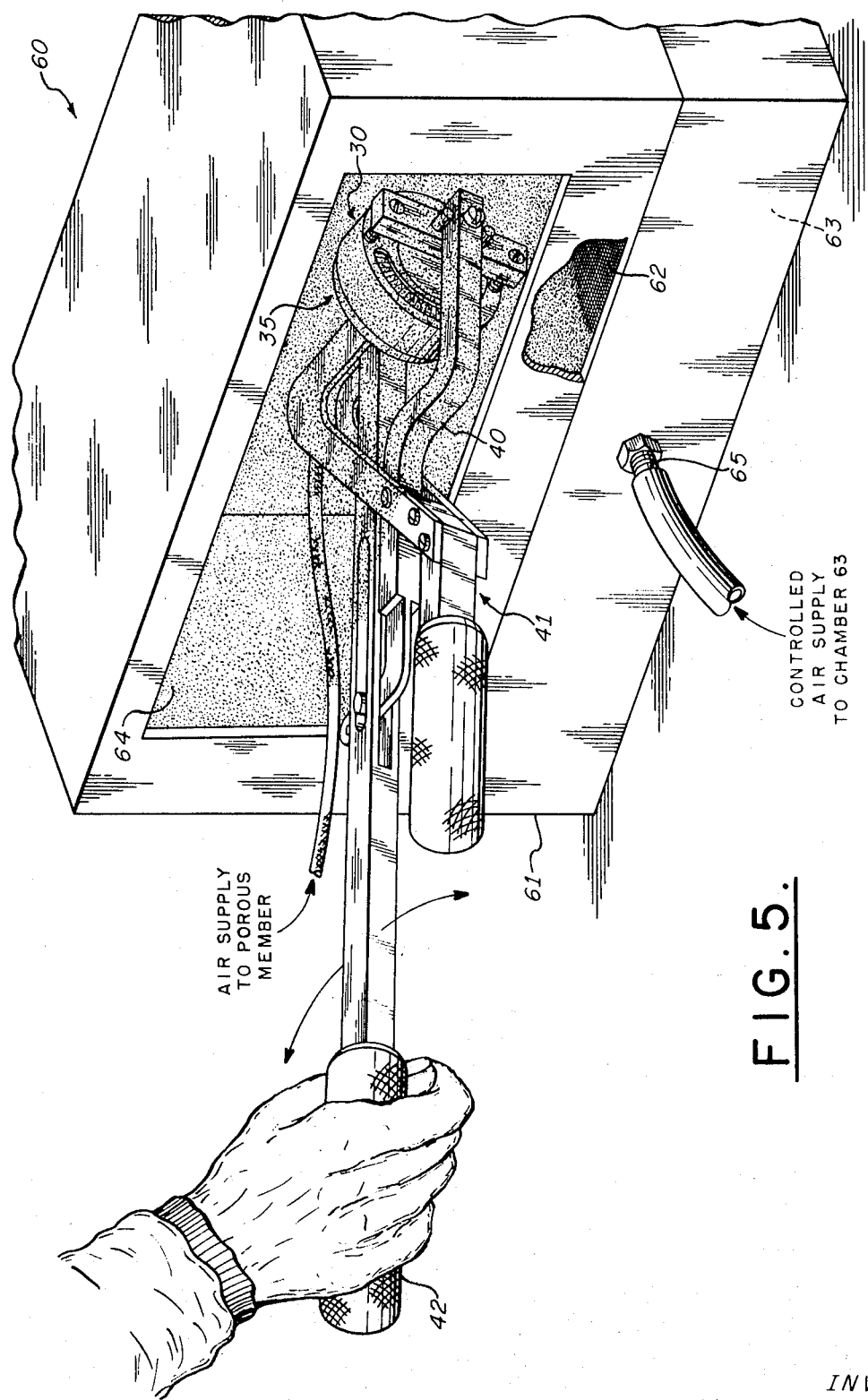

HOLDING AND MASKING FIXTURE FOR APPLYING A COATING OF THERMOSETTING MATERIAL TO SELECTED SURFACES OF A PART

BACKGROUND OF THE INVENTION

1. Field of the Invention

The present invention relates to methods for coating parts such as metal parts with thermosetting materials such as epoxy resins.

2. Description of the Prior Art

In the prior art it is common practice to coat parts with thermosetting materials. For example, in the manufacture of electrical machinery, selected surfaces of metal electrical machine elements such as stator and rotor cores are required to be electrically insulated with epoxy resin coatings. In prior practice, the elements are completely coated except perhaps for outer and inner peripheral surfaces and the excess insulation subsequently removed from the mounting and banking surfaces thereof by machining procedures. A banking surface is utilized for accurately positioning the element with respect to a structure with which it is to be assembled by abutting the banking surface against a corresponding reference surface of the structure.

In addition to the expense and time incurred by the machining operations, insulation coatings are often damaged in the process thereby necessitating rejection of the parts. Additionally, it is difficult to prevent adherence of the coating to surface areas contiguous to the peripheral edges of the parts which often results in an unsatisfactory condition of flaking and chipping of the insulation.

An alternative prior method of coating parts comprises covering the surfaces thereof which are to remain uncoated with masking tape prior to the coating process. This procedure is often unsuitable when the surfaces to be masked are of precise or small dimensions. For example, difficulty may be encountered in masking a surface area contiguous to a peripheral edge of a part for the purpose of preventing flaking and chipping of the coating. Additionally, these prior processes tend to be excessively time-consuming when applied to mass production facilities.

SUMMARY OF THE INVENTION

The present invention provides a method of coating selected surfaces of a part such as a metal electrical machine element with a thermosetting material such as an insulating epoxy resin. The method includes the heating of the part to a temperature corresponding to the adherence thereto of the powdered thermosetting material. The heated part is mounted in a masking fixture configured to clamp the part by the surfaces thereof to remain uncoated thereby precisely masking those surfaces. The masked part is immersed into a powder cloud of the thermosetting material, and the coated part is baked thereby curing the adhered material.

This method obviates the necessity of machining operations subsequent to the coating procedure thereby minimizing damage to the coated parts and significantly reducing manufacturing costs with respect to prior methods.

The present method provides for rapid and accurate masking of surface areas having precise or small dimensions, which surface areas do not afford efficacious masking by means of masking tape.

The present invention additionally provides for inhibiting the coating of selected internal surfaces of an aperture disposed in the part by positioning a porous member therein having surfaces adjacent the surfaces to remain uncoated. Compressed air injected into the interior of the porous member prevents adherence of the thermosetting material to the surfaces within the aperture which are to remain uncoated during the immersion of the part into the powder cloud of thermosetting material.

BRIEF DESCRIPTION OF THE DRAWINGS

FIG. 5 is a perspective view of a powder cloud tank showing the masked metal part immersed therein.

DESCRIPTION OF THE PREFERRED EMBODIMENT

Figure 1:
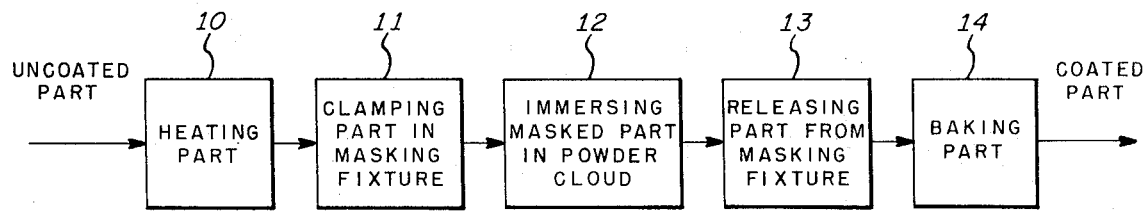
FIG. 1 is a flow diagram showing the steps in the process of coating a part in accordance with a preferred mode of practicing the invention.
Figure 2:
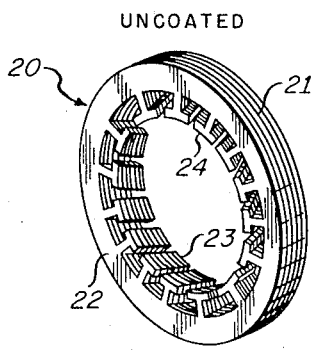
FIG. 2 is a perspective view of a metal part to be coated in accordance with the present invention.

The process of the present invention is generally indicated in the flow diagram of FIG. 1 wherein uncoated parts are shown as the initial items entering into the process, going through several operations and finally emerging as coated parts. For purposes of description, the present process will be explained in terms of coating metal parts with an electrically insulating epoxy resin which may be procured, for example, from the Minnesota Mining and Manufacturing Company under the name of Scotchcast Resin No. 262. The name Scotchcast is a trademark of the Minnesota Mining and Manufacturing Company. By way of example, the metal parts to be insulated may be electrical motor elements such as the laminated stator core 20 as illustrated in FIG. 2. The laminated stator core 20 has mounting and banking surfaces 21, 22, 23 and 24 which are to remain uncoated. The remaining surfaces of the stator core 20 are to receive a coating of the epoxy resin.

The initial step in the process, as indicated by box 10 of FIG. 1, comprises heating the stator core 20 to a temperature at which the powdered epoxy resin will adhere thereto. The temperature required for proper adherence of the resin powder may be in the range of 330° to 450° F. At these temperatures, the epoxy resin powder begins to melt thereby flowing over and adhering to the exposed and heated surfaces of the stator core 20. The heating step of the process can effectively be accomplished by means of a circulating, forced air oven with suitable controls for accurately establishing and maintaining desired internal oven temperatures.

Figure 3:
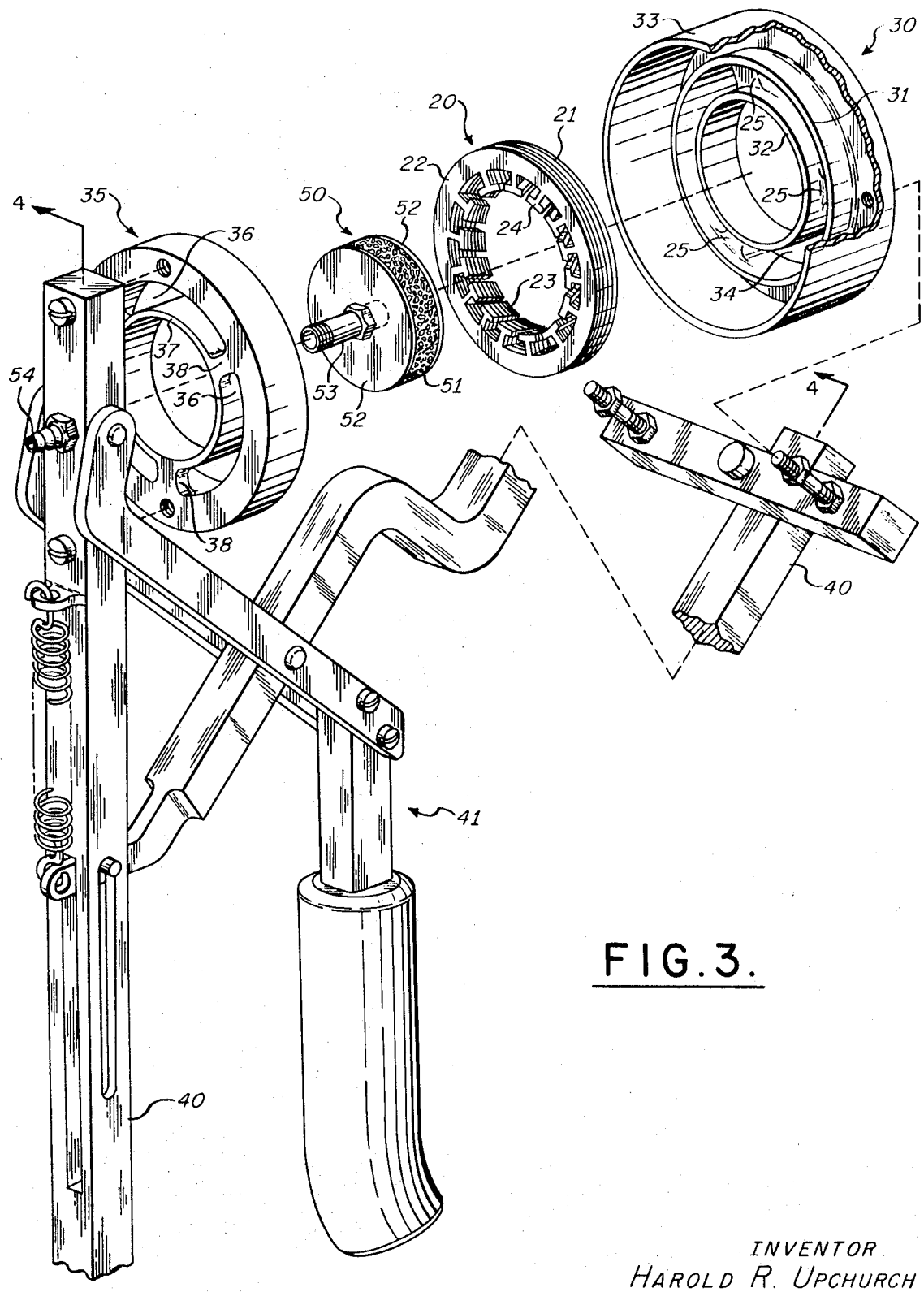
FIG. 3 is an exploded perspective view partially in section of a masking fixture and a metal part to be coated in accordance with the present invention.

After acquiring the desired temperature, the heated part 20 is removed from the oven and then clamped in a masking fixture as indicated by box 11 of FIG. 1. A masking fixture suitable for masking the stator core 20 is illustrated in FIG. 3 in which the masking fixture is shown in its open position with the stator core 20 positioned to be clamped therein. A cross-sectional view of the closed masking fixture with the stator core 20 clamped therein is illustrated in FIG. 4.

Figure 4:
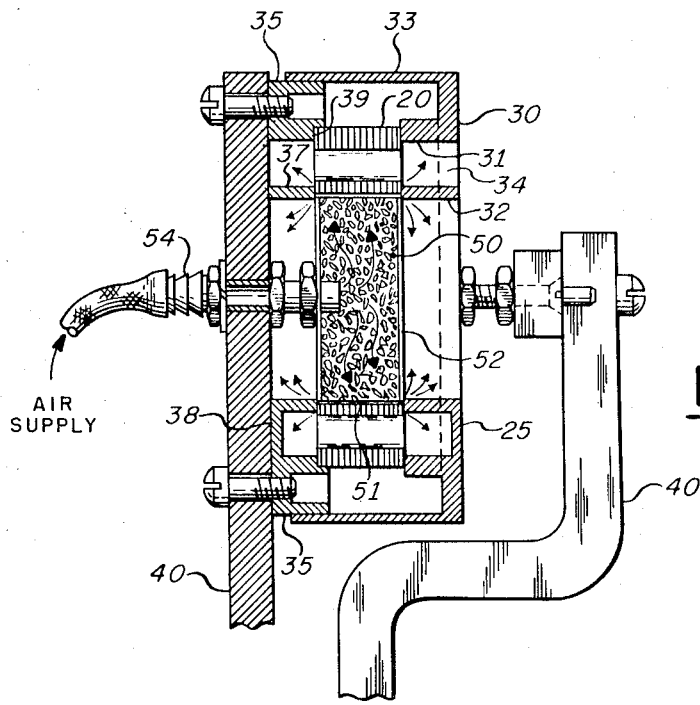
FIG. 4 is a plan view partially in cross section through the masking fixture with the part to be coated clamped therein, the section being taken along line 4—4 of FIG. 3.

Referring now to FIGS. 3 and 4 in which like reference numerals indicate like elements, the masking fixture is comprised of masking members 30 and 35, a suitable mounting structure generally indicated by reference numeral 40 and a clamping and releasing mechanism indicated generally by reference numeral 41. The masking member 35, which is rigidly bolted to the mounting structure 40, has a shoulder 39 machined therein and counterbored to a diameter equal to the outer diameter of the stator core 20. The shoulder 39 is used to position and center the stator core 20 with respect to the masking member 35 and to mask the banking surface 22 on one side thereof. The masking member 35 further comprises a masking ring 37 utilized for masking the surface 24 of the stator core 20 located on the side face at the inner edge thereof. It is desirable to mask the surface 24 to prevent chipping and flaking of the applied coating during subsequent handling of the core 20 or subsequent machining procedures thereto. The masking ring 37 is connected to the masking member 35 by means of bridging members 38 thereby defining apertures 36 which provide access to those surfaces of the stator core 20 which are to be coated by the powdered epoxy resin.

The masking member 30, which is flexibly connected to mounting structure 40 so as to permit proper alignment with stator core 20, comprises outer sleeve 33 whose inner diameter is machined to fit over the outer peripheral surface of the masking member 35. The masking member 30 further comprises a masking ring 31 which provides the masking surface for banking surface 22 of the stator core 20. The masking ring 31 is connected to the outer sleeve 33 by a ring-shaped member which provides holes therethrough for bolting the masking member 30 to the mounting structure 40. The masking member 30 is further provided with a masking ring 32 which masks the edge area 24 of the part 20 for preventing chipping and flaking of the coating as previously explained. The masking ring 32 is connected to the masking member 30 by means of three-bridging structures 25. The apertures 34 defined between the masking rings 31 and 32 provide access to those surfaces of the stator core 20 which are to be coated by the powdered epoxy resin.

The stator core 20 is provided with T-shaped petals, the inner surfaces 23 of which are to remain uncoated. Porous member 50, as illustrated in FIG. 3, prevents adherence of the epoxy resin powder to the surfaces 23, in a manner to be explained.

FIG. 3 shows stator core 20 prior to clamping between the masking members 30 and 35. Actuation of the clamping and releasing mechanism 41 moves the masking member 30 toward the masking member 35 until the stator core 20 is clamped therebetween. The porous member 50 is thereby inserted into the aperture in the part 20 defined by the surfaces 23 bringing the porous surface 51 adjacent the surfaces 23. FIG. 4 shows the closed masking fixture with the part 20 clamped therein and the porous member 50 positioned within the aperture defined by the surfaces 23. The masking rings 31, 32 and 37 as well as the shoulder 39 effectively mask the surfaces 22 and 24 on both sides of the part 20 which surfaces are to remain uncoated. The outer peripheral surface 21 of the stator core 20 is shielded from the epoxy powder by means of the closed cavity formed by the masking ring 31 and the outer sleeve 33 closed over masking member 35. Adherence of the epoxy powder to the surfaces 23 is prevented by compressed air injected into the interior of the porous member 50 via an air inlet nozzle 54 and a tubular connection 53. The air escaping through the porous surface 51 and impinging upon the surfaces 23 of the part 20 prevents adherence of the epoxy resin powder thereto. Nonporous members 52, which seal the sides of the porous member 50, guide the airflow so as to properly deflect the epoxy resin powder from the surfaces 23.

The next step in the process comprises immersing into the powder cloud of epoxy resin the masked part 20 suitably clamped in the masking fixture with the compressed air impinging on the surfaces 23 as indicated by box 12 of FIG. 1.

Referring now to FIG. 5, the part 20 clamped in the masking fixture is shown immersed in a powder cloud tank 60. The powder cloud tank 60 is comprised of chambers 63 an 64 separated by a porous membrane 62. The porosity of the membrane 62 is such that the particles of epoxy resin powder cannot pass therethrough. A controlled compressed air supply, indicated by the legend, provides compressed air to the chamber 63 via an air inlet nozzle 65. The powder tank apparatus 60 is prepared for the immersing step of the process by filling the chamber 64 with a suitable amount of the epoxy resin powder. The controlled air supply is adjusted so as to cause the powder to form a dense cloud whose upper surface attains the appearance of a gently simmering fluid. Air pressure in the range of 0 to 10 pounds per square inch from the controlled air supply is suitable to so dispose the powder. The masking fixture with the clamped part 20 is grasped by a handle 42 and immersed into the powder cloud for a time interval suitable for the adherence of an epoxy resin coating of a predetermined thickness to the stator core 20. The time interval, depending on the heat capacity of the part 20 and the desired thickness of the coating, is in the range of from 1 to 5 seconds. The clamped part is waved back and forth through the air-suspended epoxy powder cloud so as to enhance uniform circulation of the powder around the exposed surfaces of the part to be coated. Since the stator core 20 has been heated to a temperature in the range of 330° to 450° F. and the masking fixture and the porous member 50 are substantially at room temperature, the epoxy powder will adhere only to the exposed surfaces of the stator core 20 for the reason previously explained.

After the immersing step of the present process has been accomplished, the masking fixture with the stator core 20 clamped therein is removed from the powder cloud tank 60. The coated part is then released from the masking fixture, as indicated by box 13 of FIG. 1, by actuating clamping and releasing mechanism 41 as shown in FIG. 3.

The stator core 20 with the adhered epoxy resin coating is baked for approximately 30 minutes to 1 hour at a temperature of approximately 350° F. so as to cure the thermosetting coating as indicated by box 14 of FIG. 1. The baking step of the process can effectively be accomplished by means of a circulating, forced air oven of the type previously described with respect to the heating step thereof.

Figure 6:
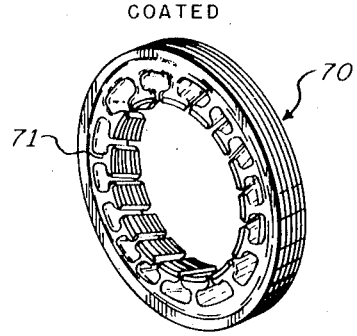
FIG. 6 is a perspective view of the metal part coated in accordance with the present invention.

The metal part 20, processed in accordance with the operations indicated in FIG. 1, emerges from the process as the coated metal part 70 as illustrated in FIG. 6. The insulation 71 has coated only those surfaces of part 20 that were exposed during the immersing step of the process.

The invention has been described in terms of coating the metal part 20 which has an aperture centrally disposed therethrough, the aperture having internal surfaces which are to remain uncoated. The porous member 50 was provided for preventing the adherence of the epoxy resin powder to those surfaces as previously described. It is to be understood that should the part to be coated not have an aperture disposed therein, then a masking element such as porous member 50 will not be required.

The masking fixture may be used successively to coat many parts provided that the temperature of the masking fixture and the associated components thereof remain substantially at room temperature so as to preclude adherence of the epoxy resin powder thereto. Since the temperature of the masking members 30 and 35 as shown in FIG. 3 may increase due to contact with the heated part 20, several such fixtures may alternately be used to coat successive parts so as to allow the fixtures to cool sufficiently between uses.

It will be appreciated that while the invention was explained in terms of coating metal parts with an insulating epoxy resin, the method is applicable to parts comprising other materials to be coated with plastics such as vinyl, nylon or Teflon for purposes such as protection or decoration.

While the invention has been described in its preferred embodiment, it is to be understood that the words which have been used are words of description rather than limitation and that changes may be made without departing from the true scope and spirit of the invention in its broader aspects.

I claim:

1. A holding and masking fixture for hand use in the fluidized bed method of applying a coating of thermosettng material to selected surfaces of relatively small parts comprising first and second masking members having masking surfaces corresponding to the surfaces to be masked of said part,
    a locking clamp mechanism comprised of
    a first mounting member,
    a second mounting member pivotally coupled to said first mounting member and movable toward and away therefrom,
    said first masking member being rigidly fixed to said first mounting member, said second masking member being flexibly attached to said second mounting member to permit proper masking alignment with said parts, a first handle including links coupled between said first and second mounting members for moving said masking members toward one another by operating said first handle by hand in one direction until said part is held therebetween with said masking surfaces abutting said surfaces to be masked, said part being clamped and locked therebetween by operating said first handle by hand to its extremity of motion in said one direction and for moving said masking members away from one another by operating said first handle by hand in the other direction for releasing said part, and a second handle fixed to said first mounting member for grasping said fixture by hand whereby to insert said clamped and masked part into said fluidized bed.

2. A fixture of the character recited in claim 1 in which said locking clamp mechanism is so constructed and arranged that said first and second masking members are substantially parallel to one another when abutting and clamping said part.

3. A fixture of the character recited in claim 2 in which said parts comprise slotted electrical motor stators having central apertures disposed therethrough whose surfaces to be masked comprise the outer peripheral rim thereof, the banking surfaces on the planar faces contiguous the outer edges thereof, the interior surfaces of said apertures and the surfaces on the planar faces thereof contiguous the edges of said aperture, said first masking member includes a recessed shoulder of diameter in accordance with the outer diameter of said stator and of width in accordance with said banking surfaces for masking said banking surfaces on one face of said stator and an inner masking ring for abutting said surfaces on said one face of said stator contiguous the edges of said apertures whereby to mask said surfaces, and said second masking member includes an outer masking ring for abutting said banking surfaces on the other face of said stator whereby to mask said banking surfaces, an inner masking ring for abutting said surfaces on said other face of said stator contiguous the edges of said apertures whereby to mask said surfaces and a sleeve adapted to fit closely over the peripheral rim of said first masking member whereby to mask said outer peripheral rim of said stator.

4. A fixture of the character recited in claim 3 in which said fixture further including a porous member fixed to said first mounting member and positioned within said apertures when said stator is clamped between said first and second masking members, said porous member shaped to provide surfaces adjacent said interior surfaces of said apertures to remain uncoated, the remaining surfaces of said porous member sealed with nonporous material, and said porous member providing an inlet for injecting compressed air into the interior thereof whereby to mask said interior surfaces.

* * * * *